(12) United States Patent
Fischer et al.

(10) Patent No.: US 9,453,917 B2
(45) Date of Patent: Sep. 27, 2016

(54) METHODS FOR SUBNANOSECOND TIME SYNCHRONIZING USING RTK RECEIVERS AND DEVICES THEREOF

(71) Applicant: Spectracom Corporation, Rochester, NY (US)

(72) Inventors: John Fischer, Corfu, NY (US); Paul E. Myers, Pittsford, NY (US)

(73) Assignee: Spectracom Corporation, Rochester, NY (US)

( * ) Notice: Subject to any disclaimer, the term of this patent is extended or adjusted under 35 U.S.C. 154(b) by 409 days.

(21) Appl. No.: 14/260,045

(22) Filed: Apr. 23, 2014

(65) Prior Publication Data

US 2015/0268352 A1    Sep. 24, 2015

Related U.S. Application Data

(60) Provisional application No. 61/815,116, filed on Apr. 23, 2013.

(51) Int. Cl.
| | |
|---|---|
| *G01S 19/44* | (2010.01) |
| *G01S 19/23* | (2010.01) |
| *G01S 19/14* | (2010.01) |
| *G01S 19/39* | (2010.01) |
| *G01S 5/02* | (2010.01) |

(52) U.S. Cl.
CPC ............. *G01S 19/23* (2013.01); *G01S 5/021* (2013.01); *G01S 19/14* (2013.01); *G01S 19/235* (2013.01); *G01S 19/39* (2013.01)

(58) Field of Classification Search
CPC ........ G01S 19/44; G01S 19/23; G01S 19/14; G01S 19/43; G01S 19/39; G01S 19/235; G01S 5/021
USPC ........................................ 342/357.27, 357.26
See application file for complete search history.

(56) References Cited

U.S. PATENT DOCUMENTS

| | | | |
|---|---|---|---|
| 2009/0322600 A1* | 12/2009 | Whitehead ............. | G01C 15/00 342/357.27 |
| 2011/0231094 A1* | 9/2011 | Simon ...................... | G01S 5/16 701/469 |

* cited by examiner

*Primary Examiner* — Harry Liu
(74) *Attorney, Agent, or Firm* — LeClairRyan, a Professional Corporation

(57) ABSTRACT

A method, non-transitory computer readable medium and timing computing device for subnanosecond time synchronization. A difference between synchronized measurements of one of a plurality of satellite signals from a reference receiver and another receiver for each of N values within a cycle is determined. A clock bias error is calculated for each of the N values. The calculated clock bias errors are stored in a vector over time for each of the N values, with one of the vectors for each of the N values. A trajectory of the vectors over time is determined. The one of the vectors with a best convergence over time is selected. A timing signal is adjusted based on the N value for the selected one of the vectors with the best convergence over time.

27 Claims, 4 Drawing Sheets

METHODS FOR SUBNANOSECOND TIME SYNCHRONIZING USING RTK RECEIVERS AND DEVICES THEREOF

This application claims the benefit of U.S. Provisional Patent Application Ser. No. 61/815,116, filed Apr. 23, 2013, which is hereby incorporated by reference in its entirety.

FIELD

The disclosure relates to methods and devices for subnanosecond time synchronizing using RTK receivers.

BACKGROUND

A global positioning system (GPS) system determines a precise position on the surface of the earth by measuring the signal propagation time from multiple orbiting satellites. Today's newer high performance GPS receivers used for Real Time Kinetic (RTK) and surveying applications are capable of achieving centimeter level 2-D position accuracy using two methods: (1) Locking to the carrier frequency as well as determining the on-time signal point; and (2) Using Differential GPS (DGPS) to cancel atmospheric effects. Further, each satellite has a precision clock in it which is accurately synchronized by ground control stations. Thus, a side benefit of these navigation systems is that the Earth is covered with a precise time synchronization signal.

With traditional time synchronization, nanosecond level synchronization is typically achieved using a low-cost GPS receiver and a timing processor to improve the accuracy of a stable Oven Controlled crystal Oscillator (OCXO). More specifically, the GPS receiver is used in conjunction with the oscillator (OCXO) and the timing processor to control or "discipline" the oscillator (OCXO) to the more accurate frequency reference derived from the satellite signal. The timing processor commands the GPS to operate in favorable modes for precision timing instead of positioning or navigation. The 1 Pulse Per Second (1PPS) signal from the GPS is used as a reference to phase lock the stable local oscillator. A voltage controlled oscillator (VOCXO) is used so it can be adjusted in phase relative to the 1PPS reference.

This traditional time synchronization, however, does not achieve the desired picosecond level performance because the 1PPS output is a composite from many pseudorange measurements from all of the satellites in view and because the on-time point is derived from the demodulated spread spectrum signal. The most precise spread spectrum signal from these satellites, the P code, is only 10 MHz in bandwidth, limiting the accuracy to a few nanoseconds at best.

SUMMARY

A method for subnanosecond time synchronization includes determining, by a timing computing device, a difference between synchronized measurements of one of a plurality of satellite signals from a reference receiver and another receiver for each of N values within a cycle. A clock bias error is calculated, by the timing computing device, for each of the N values. The calculated clock bias errors are stored, by the timing computing device, in a vector over time for each of the N values, with one of the vectors for each of the N values. A trajectory of the vectors over time is determined by the timing computing device. The one of the vectors with a best convergence over time is selected by the timing computing device. A timing signal is adjusted, by the timing computing device, based on the N value for the selected one of the vectors with the best convergence over time.

A non-transitory computer readable medium having stored thereon instructions for subnanosecond time synchronization comprising machine executable code which when executed by a processor, causes the processor to perform steps including determining a difference between synchronized measurements of one of a plurality of satellite signals from a reference receiver and another receiver for each of N values within a cycle. A clock bias error is calculated for each of the N values. The calculated clock bias errors are stored in a vector over time for each of the N values, with one of the vectors for each of the N values. A trajectory of the vectors over time is determined The one of the vectors with a best convergence over time is selected. A timing signal is adjusted based on the N value for the selected one of the vectors with the best convergence over time.

A subnanosecond time synchronizing apparatus comprising at least one of configurable hardware logic configured to implement or a processor configured to execute programmed instructions stored in a memory including determining a difference between synchronized measurements of one of a plurality of satellite signals from a reference receiver and another receiver for each of N values within a cycle. A clock bias error is calculated for each of the N values. The calculated clock bias errors are stored in a vector over time for each of the N values, with one of the vectors for each of the N values. A trajectory of the vectors over time is determined. The one of the vectors with a best convergence over time is selected. A timing signal is adjusted based on the N value for the selected one of the vectors with the best convergence over time.

This technology provides a number of advantages including providing more effective methods and devices for subnanosecond time synchronizing using RTK receivers. This exemplary method extracts the precise time information via a two-step process: (1) Solve the RTK solution for position using the standard double differencing approach; and (2) return to the single difference equation, substituting the known range values and integer ambiguities values determined in step 1. What is left is the receiver's clock bias, which is the parameter this technology wishes to track. Once the receiver's apparent clock bias is known, a servo loop is constructed to adjust the receiver's local oscillator until this clock bias is zero.

The present technology utilizes today's high performance GPS or GNSS (Global Navigation Satellite Systems) receivers to obtain picosecond level synchronization can be obtained over a distributed area. Additionally, this technology provides a wireless method for distributing precise clock synchronization to each element in a phased array antenna and as a result has benefits in all kinds of sensing applications, including signals intelligence (SIGINT), EW, and Radar. Further, since this technology is wireless it eliminates the need for cabling among the elements, allowing for larger spacing among elements and larger apertures, including synthetic ones. The distributed time synchronization provided by this technology also is beneficial for Time Difference of Arrival (T/FDOA) applications to determine position. Moreover, since time synchronization alignment can be achieved more globally to Universal Coordinated Time (UTC) with this technology, these sensing elements can be used in several new and innovative ways.

DETAILED DESCRIPTION

Figure 1:
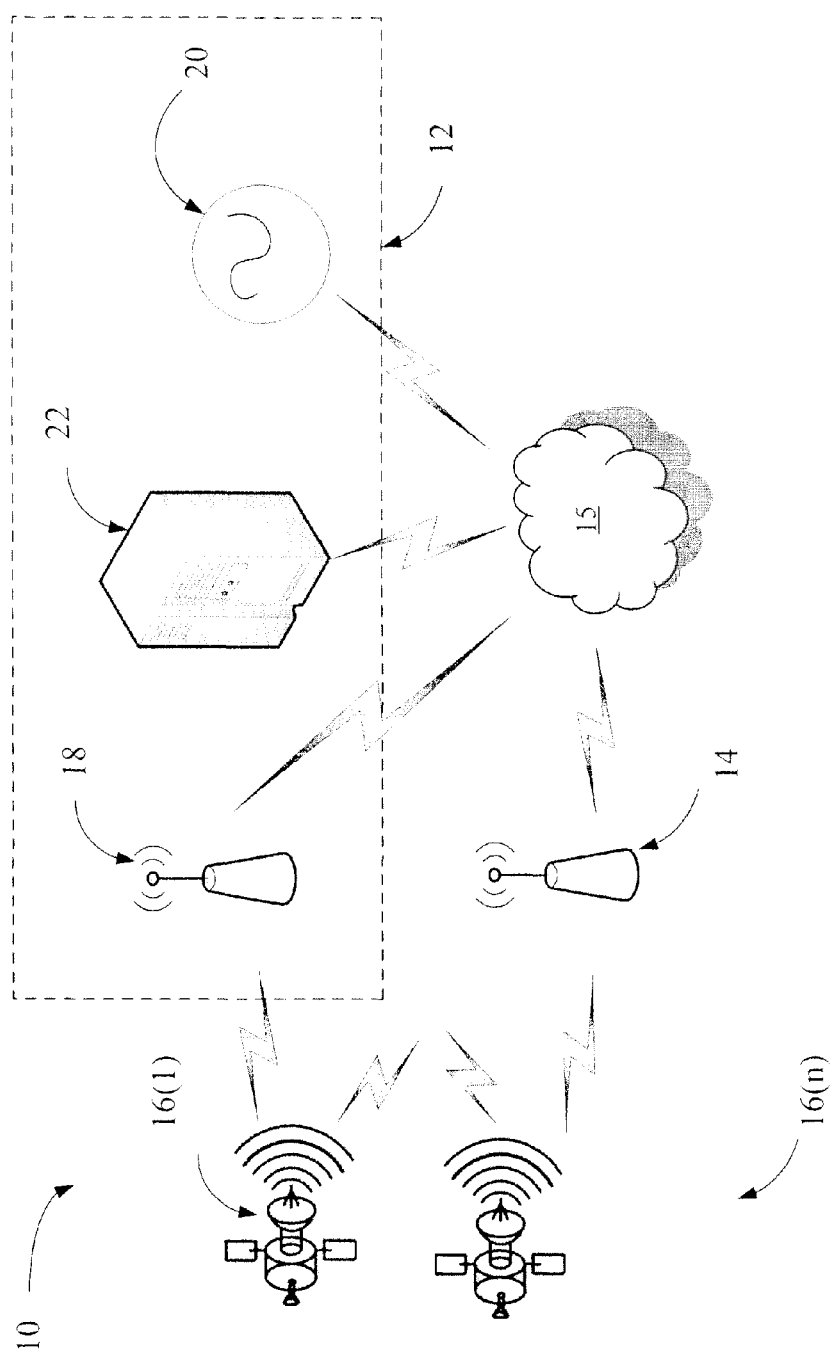
FIG. 1 is an exemplary environment including a subnanosecond time synchronizing GPS system including a timing computing device for subnanosecond time synchronization.

An environment 10 with an exemplary subnanosecond GPS time synchronizing apparatus 12 for subnanosecond GPS time synchronization is illustrated in FIG. 1. The environment 10 includes the GPS time synchronization apparatus 12 and a reference receiver 14, which are coupled together by a communication network 15 and interact with one or more satellites 16(1)-16(n), although the environment 10 can include other types and numbers of systems, devices, components, and/or elements in a variety of other topologies and deployments. This technology provides a number of advantages including providing more effective methods and devices for subnanosecond time synchronizing using RTK receivers.

Referring more specifically to FIG. 1, the reference receiver 14 is a high precision GPS real time kinematic receiver (RTK) receiver, although other types of receivers can be utilized with other types of positioning systems, such as GLONASS or Galileo by way of example only. The reference receiver 14 may include a central processing unit (CPU) or processor, a memory, and an interface device, which are coupled together by a bus or other link, although other numbers and types of network devices could be used. The reference receiver 14 communicates with the GPS time synchronization apparatus 12 to provide carrier phase measurements as sourced from atomic clock of one of the one or more satellites 16(1)-16(n), although the reference receiver 14 may interact with the GPS time synchronization system in other manners. In this example, the reference receiver 14 is located at a base station with a known position, although the reference receiver 14 may alternatively be a mobile unit at an unknown position if only a relative synchronization is desired. Satellites 16(1)-16(n) are GPS satellites, although other navigation systems such as GLONASS or Galileo, by way of example only, may be utilized.

Figure 2:
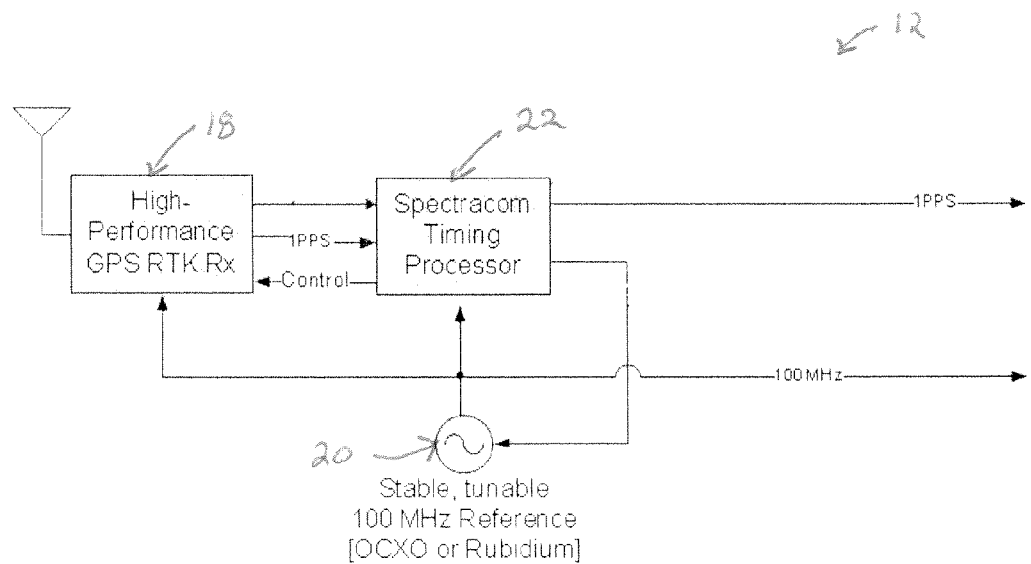
FIG. 2 is an exemplary functional block diagram of the subnanosecond time synchronizing GPS system shown in FIG. 1.

Referring more specifically the time synchronizing GPS system illustrated in FIGS. 1 and 2 the time synchronizing GPS apparatus 12 includes a receiver 18, an oscillator 20, and a timing computing device 22, which are coupled together by the communication network 15, although this system can comprise other types and numbers of systems, device, components or other elements in other configurations. This technology provides a number of advantages including providing more effective methods, non-transitory computer readable media, and devices for time synchronization using GPS RTK devices.

The receiver 18 is a high precision GPS RTK receiver, although other types of receivers can be utilized with other types of positioning systems, such as GLONASS or Galileo by way of example only. The receiver 18 may include a central processing unit (CPU) or processor, a memory, and an interface device, which are coupled together by a bus or other link, although other numbers and types of network devices could be used. The receiver 18 communicates with the timing computing device 22 to provide carrier phase measurements as sourced from atomic clock of one of the one or more GPS satellites 16(1)-16(n), although the receiver 18 may interact with the timing computing device 22 to provide other information, such as a 1PPS signal.

The oscillator 20 is a stable Voltage Controlled Oven Compensated crystal Oscillator (VOCXO), although other types and/or numbers of oscillators could be used, such as a Rubidium oscillator. The oscillator 20 interacts with the timing computing device 22 to receive phase adjustments to correct the frequency of the oscillator 20, although the oscillator may interact with the timing computing device 22 in other manners.

Figure 4:
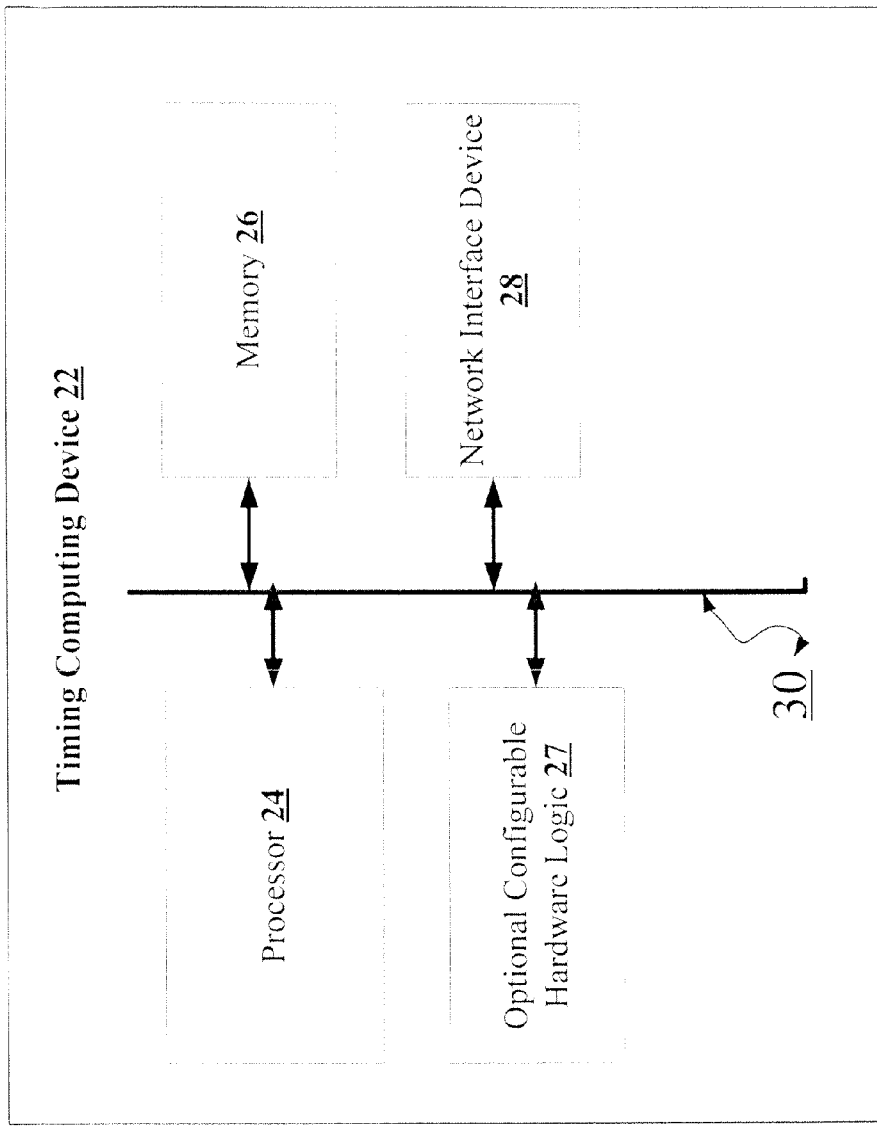
FIG. 4 is an exemplary block diagram of the timing computing device.

Referring now to FIG. 4, the timing computing device 22 includes a central processing unit (CPU) or processor 24, a memory 26, optional configurable hardware logic 27, and a network interface device 28, which are coupled together by a bus 30 or other link, although other numbers and types of systems, devices, components, and elements in other configurations and locations can be used. The processor 24 in the timing computing device 22 executes a program of stored instructions for one or more aspects of the present technology as described and illustrated by way of the examples herein, although other types and numbers of processing devices and logic could be used and the processor could execute other numbers and types of programmed instructions.

Figure 5:
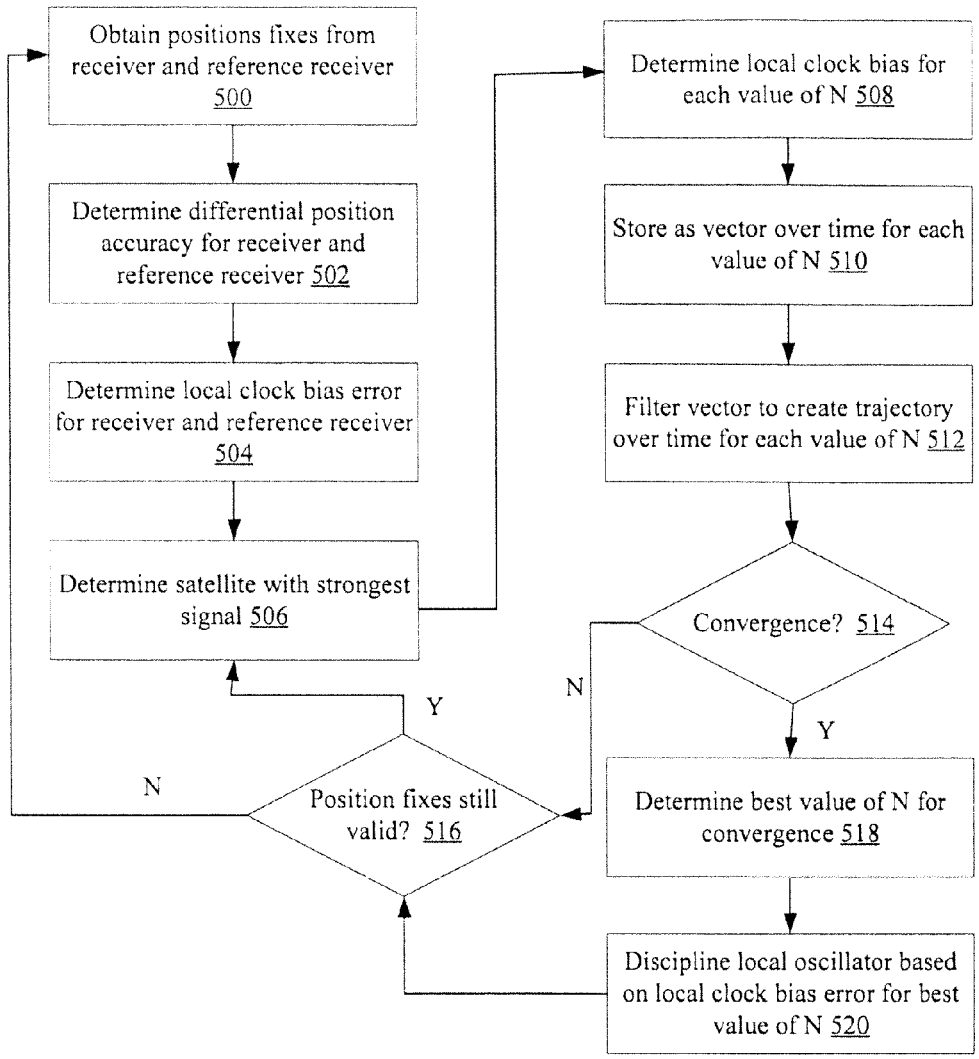
FIG. 5 is an exemplary flow chart for a method for subnanosecond time synchronization.

The memory 26 in the timing computing device 22 stores these programmed instructions for one or more aspects of the present technology as described and illustrated herein. A variety of different types of memory storage devices, such as a random access memory (RAM) and/or read only memory (ROM) in the timing computing device or a floppy disk, hard disk, CD ROM, DVD ROM, or other computer readable medium which is read from and written to by a magnetic, optical, or other reading and writing system that is coupled to the processor in the timing computing device, can be used for the memory. By way of example only, the flow chart shown in FIG. 5 is representative of programmed steps or actions of this technology that may be embodied or expressed as one or more non-transitory computer or machine readable media having instructions stored in memory 26 that may be executed by the processor 24, although other types and numbers of programmed instructions and/or other data may be stored.

The optional configurable hardware logic 27 of the timing computing device 22 may comprise specialized hardware configured to be capable of implementing one or more steps of this technology as illustrated and described with reference to the examples herein. By way of example only, the optional configurable logic 27 may comprise one or more of field programmable gate arrays (FPGAs), field programmable logic devices (FPLDs), application specific integrated circuits (ASICs) and/or programmable logic units (PLUs).

The network interface device 28 of the timing computing device 22 operatively couples and facilitates communication between the timing computing device 22, the receiver 18, and the oscillator 20 through communication network 15, although other types and numbers of communication networks or systems with other types and numbers of connections and configurations can be used. Additionally, communication network 15 can include one or more local area networks (LANs) and/or wide area networks (WANs). By way of example only, the communication networks can use TCP/IP over Ethernet and industry standard protocols, including hypertext transfer protocol (HTTP) and/or secure HTTP (HTTPS), although other types and numbers of communication networks also can be used.

Referring back to FIGS. 1 and 2, in this example, the receiver 18 is used in conjunction with the oscillator 20 and the timing computing device 22 to create a Phase Locked Loop (PLL) control. The timing computing device 22 controls the GPS RTK receiver 18 to optimally select the best satellite reference 16(1)-16(n) to correct the frequency of the oscillator 20. The PLL control adjusts the phase of the oscillator 20 to match the phase of the GPS satellite 16(1)-16(n) carrier signal, as sourced from the highly stable satellite atomic clock.

The timing computing device 22 controls the receiver 18 optimally by selecting the best satellite reference 16(1)-16(n) to correct the frequency of the oscillator 20. It locks to the phase of the carrier signal of that satellite by reading the phase error measurements and using the phase error measurements for the input to its disciplining algorithm instead of the 1PPS signal. In this example, the receiver 18 locks to the L1 signal from the satellite, although the receiver could lock to the L2 or L5 signal (L5 is operational on one satellite today and has a few differentiating characteristics from L1 and L2 that could make it more desirable for this technology, such as higher power and an unmodulated component).

Figure 3:
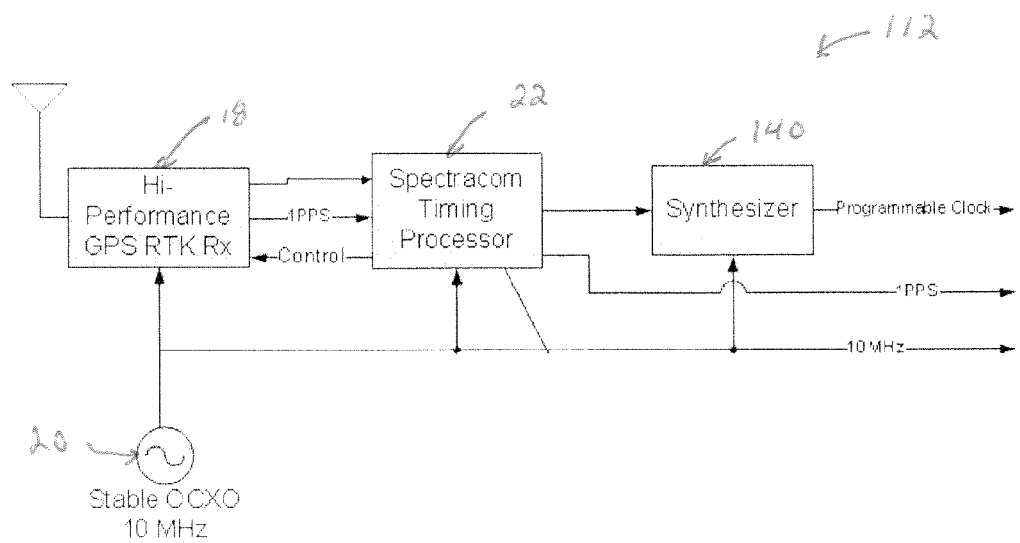
FIG. 3 is an exemplary functional block diagram of another subnanosecond time synchronizing GPS system.

Another example of a subnanosecond time synchronizing GPS apparatus 112 is illustrated in FIG. 3. This system in FIG. 3 is the same in structure and operation as the system in FIG. 1, except as illustrated and described herein. The apparatus 112 includes the high precision GPS real time kinematic (RTK) receiver 18, the stable Oven Compensated crystal Oscillator (OCXO) 20, the timing computing device 22, and a synthesizer 140, which are coupled together, although this system can comprise other types and numbers of systems, devices, components or other elements in other configurations. The synthesizer 140 is configured to create a corrected stable frequency reference, although other types of synthesizers can be used.

Synthesizer 140 synthesizes the corrected frequency instead of controlling the oscillator 20. The noise introduced by the oscillator 20 is eliminated resulting in a quieter reference. Also, it offers more choices for the sample clock frequency, allowing this timing module to be adapted to more applications easily. However, the synthesizer approach introduces noise of its own (for example: quantization) so care must be taken, but overall a quieter result is expected.

In this alternative example, the timing computing device 22 configures and controls the receiver 18 and reads the phase error measurements from each satellite 16(1)-16(n). Based on signal strength, Doppler shift, elevation angle, and other parameters, the timing computing device 22 selects a particular satellite 16(1)-16(n) to use as a phase reference. From this phase measurement, timing computing device 22 controls the synthesizer 140 to create the corrected stable frequency reference. The synthesizer 140 may provide the corrected stable frequency reference to a programmable clock, although the corrected stable frequency reference may be provided to other types and number of devices.

Although an example of the timing computing device 22 is illustrated and described herein with the examples shown in FIGS. 1-4, it is to be understood that the device is for exemplary purposes only, as many variations of the specific hardware and software used to implement the examples are possible, as will be appreciated by those skilled in the relevant art(s). In addition, two or more computing systems or devices can be substituted for any one of the systems in any embodiment of the examples.

Aspects of this technology may also be embodied as a non-transitory computer readable medium having instructions stored thereon as described and illustrated by way of the examples herein, which when executed by a processor, cause the processor to carry out the steps necessary to implement the methods of the examples, as described and illustrated herein.

An exemplary method for subnanosecond time synchronization will now be illustrated with reference to FIG. 5. In step 500, the timing computing device 22 obtains position information from the receiver 18 and the reference receiver 14. The receiver 18 and the reference receiver 14 lock to the carrier signal of one or more of the satellites 16(1)-16(n) as is standard for GPS receivers. The receiver 18 and the reference receiver 14 lock to the L1 signal from the one or more satellites 16(1)-16(n), although the receiver could lock to the L2 or L5 signal. The carrier phase measurement from a $k^{th}$ satellite of the one or more satellites 16(1)-16(n), at the receiver 18 (denoted as the user receiver by the subscript u) may be expressed in the following equation as:

$$\emptyset_u^{(k)} = \lambda^{(-1)}[r_u^{(k)} - I_u^{(k)} + T_u^{(k)}] + f(\delta t_u - \delta t^{(k)}) + N_u^{(k)} + \epsilon_{\emptyset_u}^{(k)} \qquad (1)$$

where $\emptyset_u^{(k)}$ is the carrier phase measurement from satellite k at receiver 18 (u), $\lambda$ is the carrier wavelength, $r_u^{(k)}$ is the geometric range of the receiver 18 (u) to the satellite (k), f is the carrier frequency, $I_u^{(k)}$ and $T_u^{(k)}$ are the ionospheric advance and the tropospheric delay in units of length, $\delta t_u$ and $\delta t^{(k)}$ are the receiver and satellite clock biases in seconds, $N_u^{(k)}$ is the integer ambiguity of the carrier measurement, and $\epsilon_{\emptyset_u}^{(k)}$ is the carrier phase measurement errors which include receiver noise and multipath error.

In step 502, the timing computing device 22 determines the differential position accuracy between the receiver 18 and the reference receiver 14 using the standard double differencing approach for RTK receivers. More specifically, the timing computing device 22 determines the difference in phase of the signal from a $k^{th}$ satellite of the one or more satellites 16(1)-16(n) between the receiver 18 and the reference receiver 14 (denoted as the reference receiver by the subscript r) minus the difference in phase of the signal from an $l^{th}$ satellite of the one or more satellites 16(1)-16(n) between the receiver 18 and the reference receiver 14. The double difference equation is:

$$\emptyset_{ur}^{(kl)} = \lambda^{(-1)} r_{ur}^{(kl)} + N_{ur}^{(kl)} + \epsilon_{\emptyset_{ur}}^{(kl)} \qquad (2)$$

where the term $\delta t_{ur}$, the difference in local clock bias between the two receivers, goes to zero because the local clock bias is common for both satellite measurements. For short baselines where the distance between the receiver 18 and the reference receiver 14 is less than a kilometer, the ionospheric and tropospheric factors are nearly zero because the signals from the satellites traverse almost identical volumes to both receivers.

The carrier phase measurements: $\emptyset_u^{(k)}$ and $\emptyset_u^{(l)}$ are measured by the receiver 18, while the carrier phase measurements $\emptyset_r^{(l)}$ and $\emptyset_r^{(l)}$ are measured by the reference receiver 14. $N_{ur}^{(kl)}$ is estimated using a standard disambiguation process. The carrier phases measurement error $\epsilon_{\emptyset_{ur}}^{(kl)}$ is greater than the carrier phase measurement error $\epsilon_{\emptyset_{ur}}^{(k)}$ and accepted as undetermined error. The ranges to each satellite from the receiver 18, $r_u^{(k)}$ and $r_u^{(l)}$, are calculated.

Next, in step 504, the timing computing device 22 determines the local clock bias error for the receiver 18 and the reference receiver 14 using the 1PPS output from the receivers. The local clock bias error is determined at each receiver to within approximately 10 nanoseconds, although other error tolerances could be used in other examples. The local clock bias error provides a coarse clock correction error that may be utilized for the subnanosecond time synchronization as described below.

In step 506, the timing computing device 22 determines the one of the satellites 16(1)-16(n) with the strongest signal level, by way of example only, the satellite located closest to the zenith with zero Doppler effect for both receivers that is visible for both receivers. For time synchronization, the timing computing device 22 may choose a single satellite, although the timing computing device 22 may choose a pair of satellites, by way of example only, satellite pairs with diverging $N_{ur}^{(kl)}$ values. For timing, only one satellite is necessary, though statistical combining of multiple satellite measurements may yield better long term stability.

In step 508, the timing computing device 22 determines the local clock bias error for each value of N within the range of the coarse clock correction error of the 1PPS determined in step 504 for the satellite selected in step 506. The following equations are described with respect to a $k^{th}$ satellite of the one or more satellites 16(1)-16(n). The local clock bias error for each value of N is determined using the following single difference equation:

$$\phi_{ur}^{(k)} = \phi_u^{(k)} - \phi_r^{(k)} \qquad (3)$$

which represents the phase difference between the receiver 18 (denoted as user receiver u) and reference receiver 14 (denoted as reference receiver r) for the signal from the satellite k of the one or more satellites 16(1)-16(n). Substituting the carrier phase measurements using equation 1, equation 3 becomes:

$$\phi_{ur}^{(k)} = \lambda^{(-1)}[r_{ur}^{(k)} - I_{ur}^{(k)} + T_{ur}^{(k)}] + f \cdot (\delta t_{ur}) + N_{ur}^{(k)} + \epsilon_{\phi ur}^{(k)} \qquad (4)$$

The term $\delta t^{(s)}$ from equation 1, which represents the satellite's clock bias, goes to zero because it is common to both the receiver 18 and the reference receiver 14. Further, for short baselines where the distance between the receiver 18 and the reference receiver 14 is less than a kilometer, the ionospheric and tropospheric factors are nearly zero because the signal from the satellite k traverses almost the identical volume to both receivers. This reduces the phase difference to:

$$\phi_{ur}^{(k)} = \lambda^{(-1)} r_{ur}^{(k)} + f \cdot \delta t_{ur} + N_{ur}^{(k)} + \epsilon_{\phi ur}^{(k)} \qquad (5)$$

The ranges $r_u^{(k)}$ and $r_r^{(k)}$ were determined in step 502, while the phase carrier measurements are measured by the receiver 18 and the reference receiver, leaving the clock bias $\delta t_{ur}$, which this technology seeks to extract and use as an error signal to discipline oscillator 20, and the integer ambiguity of the carrier measurement $N_{ur}^{(k)}$, as the only unknowns in equation 5. The timing computing device 22 determines the local clock bias error for each value of N within the range of the coarse clock correction error of the 1PPS. This technology employs a swarm solution to calculate the $\delta t_{ur}$ trajectories for all possible values of $N_{ur}^{(k)}$ in the valid set and to choose the best trajectory that matches the known characteristics of the oscillator 20 as described further below.

Although N is unknown it is bounded by a few factors. N is an integer and from the code range measurement that achieves ~10 ns accuracy, is bounded to a finite set of a couple dozen valid values. In this example, the timing computing device 22 knows the difference $N_{ur}^{(k)}$ between any two satellite's N values, which limits the solution set even further. This technology does not need a continuous time transfer measurement as the timing computing device 22 is disciplining a local high stability oscillator 20. Thus, only sporadic clock bias measurements are required, so periods of time when the clock bias is indeterminate do not impact the effectiveness of the disciplining of the oscillator 20.

The stability of the local oscillator 20 may be increased if the local oscillator 20 is also frequency locked to the received carrier of a particular one of the satellites 16(1)-16(n). Suitable frequency lock is achievable from the code signal (1PPS), albeit over a long period of time. If time to first fix is not a major concern, waiting until a stable time and frequency lock is achieved from the code signal would limit the ambiguity set of N further. Also, for a receiver 18 that has SBAS capability (Satellite Based Augmentation Systems such as WAAS or Egnos), those geostationary satellites may be useful for frequency lock. Lastly, the solution set for N can be further limited using widelane techniques with L1 and L2 measurements.

Next, in step 510, the timing computing device 22 stores the local clock bias error $\delta t_{ur}$ for each N value in a vector over time, although the timing computing device 22 may store other values in other manners. One vector over time is stored for each N value. The vectors over time may be stored in the memory 26 of the timing computing device 22 although the vectors over time may be stored in other locations. In step 512, the timing computing device 22 filters the vectors to create a trajectory over time for each value of N, using standard filtering techniques.

In step 514, the timing computing device 22 determines whether there is a convergence for the trajectory over time for any of the N values. If in step 514, the timing computing device 22 determines there is no convergence, then the No branch is taken to step 516 where the timing processor determines whether the position fixes are still valid for the receivers. If in step 516, the position fixes are no longer valid, the No branch is taken to step 500 where the process is restarted. If in step 516, the position fixes are determined to be valid, the Yes branch is taken to step 506.

If in step 514, the timing computing device 22 determines there is convergence, then the Yes branch is taken to step 518 where the timing computing device 22 determines the best value of N. Next, in step 520, the timing computing device 22 disciplines the local oscillator 20 based on the local clock bias error $\delta t_{ur}$ for the best value of N determined in step 518. The oscillator disciplining algorithm may take into account several factors, such as: (1) transitioning between selected satellites in a coordinated way with the TDOA application, so that, for example, all sensor elements are always using the same reference to reduce the jitter effect; (2) limiting the slewing control bandwidth so the output clock frequency achieves the stability specifications, possibly even coordinating corrections with the TDOA sensor's receiver so changes occur only at selected times; and/or (3) compensating for temperature: though the local oscillator 20 is temperature compensated, the receiver 18 is not, although other types and numbers of factors could be used. The timing computing device 22 may be able to compensate for these variations, although the timing computing device 22 may compensate for other types and numbers of variations. Next, the exemplary method proceeds to step 516 where the timing computing device 22 determines whether the position fixes are still valid as described above.

The technology disclosed herein provides advantages of providing more effective methods and devices for subnanosecond time synchronizing using RTK receivers. This technology provides a wireless method for distributing precise clock synchronization to each element in a phased array antenna and as a result has benefits in all kinds of sensing applications, including signals intelligence (SIGINT), EW, and Radar. Further, since this technology is wireless it eliminates the need for cabling among the elements, allowing for larger spacing among elements and larger apertures, including synthetic ones. The distributed time synchronization provided by this technology also is beneficial for Time Difference of Arrival (T/FDOA) applications to determine position. Moreover, since time synchronization alignment can be achieved more globally to Universal Coordinated Time (UTC) with this technology, these sensing elements can be used in several new and innovative ways.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for subnanosecond time synchronization, the method comprising:
   determining, by the timing computing device, a difference between synchronized measurements of one of a plurality of satellite signals from a reference receiver and another receiver for each of N values within a cycle;
   calculating, by the timing computing device, a clock bias error for each of the N values;
   storing, by the timing computing device, the calculated clock bias errors in a vector over time for each of the N values, with one of the vectors for each of the N values;
   determining, by the timing computing device, a trajectory of the vectors over time;
   selecting, by the timing computing device, the one of the vectors with a best convergence over time; and
   adjusting, by the timing computing device, a timing signal based on the N value for the selected one of the vectors with the best convergence over time.

2. The method of claim 1 further comprising:
   selecting, by the timing computing device, the one of the plurality of satellite signals based on one or more of a signal strength of each of the plurality of satellite signals, a Doppler shift of each of the plurality of satellite signals, or an elevation angle of each of the satellites for each of the plurality of satellite signals.

3. The method of claim 1 wherein the determining further comprises filtering, by the timing computing device, each of the stored vectors to create the trajectory over time.

4. The method of claim 1 further comprising:
   determining, by the timing computing device, an initial clock bias error;
   determining, by the timing computing device, a range of N values based on the determined initial clock bias error;
   calculating, by the timing computing device, the clock bias error for each of the N values within the determined range of N values.

5. The method of claim 4 wherein the determining the initial clock bias error further comprises:
   receiving, by the timing computing device, position fixes for two locations;
   determining, by the timing computing device, differential position accuracy for the two locations based on the received position fixes; and
   determining, by the timing computing device, the initial clock bias error based at least on the determined differential position accuracy for the two locations.

6. The method of claim 4 wherein the determined initial clock bias error is ten nanoseconds or less.

7. The method of claim 1 wherein the adjusting the timing signal further comprises adjusting, by the timing computing device, an oscillator to adjust the timing signal.

8. The method of claim 1 wherein the adjusting the timing signal further comprises controlling, by the timing computing device, a synthesizer to adjust the timing signal.

9. The method of claim 1 wherein the reference receiver and the another receiver each are one of a GPS, GLONASS, Galileo, or Beidou receiver.

10. A non-transitory computer readable medium having stored thereon instructions for subnanosecond time synchronization comprising machine executable code which when executed by a processor, causes the processor to perform steps comprising:
    determining a difference between synchronized measurements of one of a plurality of satellite signals from a reference receiver and another receiver for each of N values within a cycle;
    calculating a clock bias error for each of the N values;
    storing the calculated clock bias errors in a vector over time for each of the N values, with one of the vectors for each of the N values;
    determining a trajectory of the vectors over time;
    selecting the one of the vectors with a best convergence over time; and
    adjusting a timing signal based on the N value for the selected one of the vectors with the best convergence over time.

11. The medium of claim 10 wherein the medium further comprises machine executable code which, when executed by the processor, causes the processor to perform steps further comprising:
    selecting the one of the plurality of satellite signals based on one or more of a signal strength of each of the plurality of satellite signals, a Doppler shift of each of the plurality of satellite signals, or an elevation angle of each of the satellites for each of the plurality of satellite signals.

12. The medium of claim 10 wherein the determining further comprises filtering each of the stored vectors to create the trajectory over time.

13. The medium of claim 10 wherein the medium further comprises machine executable code which, when executed by the processor, causes the processor to perform steps further comprising:
    determining an initial clock bias error;
    determining a range of N values based on the determined initial clock bias error;
    calculating the clock bias error for each of the N values within the determined range of N values.

14. The medium of claim 13 wherein the determining the initial clock bias error further comprises:
    receiving position fixes for two locations;
    determining differential position accuracy for the two locations based on the received position fixes; and
    determining the initial clock bias error based at least on the determined differential position accuracy for the two locations.

15. The medium of claim 13 wherein the determined initial clock bias error is ten nanoseconds or less.

16. The medium of claim 10 wherein the medium further comprises machine executable code which, when executed by the processor, causes the processor to perform steps further comprising adjusting the timing signal of an oscillator to adjust the timing signal.

17. The medium of claim 10 wherein the medium further comprises machine executable code which, when executed by the processor, causes the processor to perform steps further comprising controlling a synthesizer to adjust the timing signal.

18. The medium of claim 10 wherein the reference receiver and the another receiver each are one of a GPS, GLONASS, Galileo, or Beidou receiver.

19. A subnanosecond time synchronizing apparatus comprising:
 at least one of configurable hardware logic configured to implement or a processor configured to execute programmed instructions stored in a memory comprising:
  determining a difference between synchronized measurements of one of a plurality of satellite signals from a reference receiver and another receiver for each of N values within a cycle;
  calculating a clock bias error for each of the N values;
  storing the calculated clock bias errors in a vector over time for each of the N values, with one of the vectors for each of the N values;
  determining a trajectory of the vectors over time;
  selecting the one of the vectors with a best convergence over time; and
  adjusting a timing signal based on the N value for the selected one of the vectors with the best convergence over time.

20. The apparatus of claim 19 wherein the configurable hardware logic is configured to implement or the processor is configured to execute programmed instructions stored in the memory further comprising:
 selecting the one of the plurality of satellite signals based on one or more of a signal strength of each of the plurality of satellite signals, a Doppler shift of each of the plurality of satellite signals, or an elevation angle of each of the satellites for each of the plurality of satellite signals.

21. The apparatus of claim 19 wherein the determining further comprises filtering each of the stored vectors to create the trajectory over time.

22. The apparatus of claim 19 wherein the configurable hardware logic is configured to implement or the processor is configured to execute programmed instructions stored in the memory further comprising:
 determining an initial clock bias error;
 determining a range of N values based on the determined initial clock bias error;
 calculating the clock bias error for each of the N values within the determined range of N values.

23. The apparatus of claim 22 wherein the determining the initial clock bias error further comprises:
 receiving position fixes for two locations;
 determining differential position accuracy for the two locations based on the received position fixes; and
 determining the initial clock bias error based at least on the determined differential position accuracy for the two locations.

24. The apparatus of claim 22 wherein the determined initial clock bias error is ten nanoseconds or less.

25. The apparatus of claim 19 further comprising an oscillator coupled to the at least one of the configurable hardware logic or the processor wherein the at least one of configurable hardware logic is configured to implement or the processor coupled to the memory is configured to provide programmed instructions for the adjusting the timing signal of the oscillator.

26. The apparatus of claim 19 further comprising a synthesizer coupled to the at least one of the configurable hardware logic or the processor wherein the at least one of configurable hardware logic is configured to implement or the processor coupled to the memory is configured to provide programmed instructions for controlling the synthesizer to adjust the timing signal.

27. The apparatus of claim 19 wherein the reference receiver and the another receiver each are one of a GPS, GLONASS, Galileo, or Beidou receiver.

* * * * *